Figure 1:
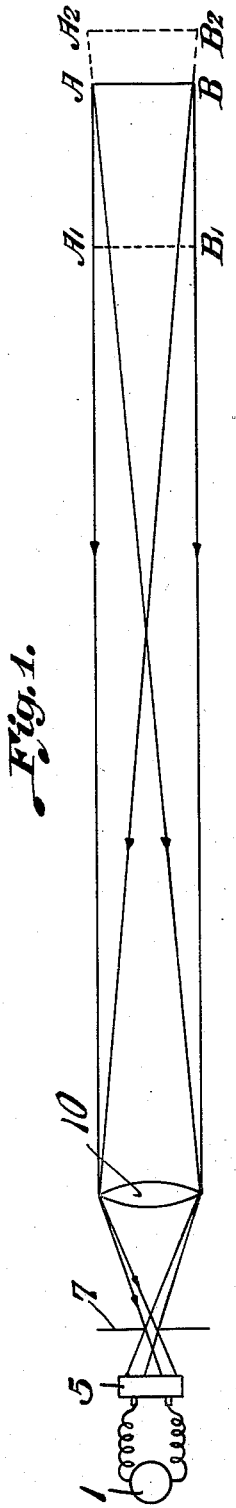

March 23, 1937. W. J. CLARK 2,074,641
MEASUREMENT OF HIGH TEMPERATURES
Filed Sept. 30, 1936

Inventor:
William Jasper Clark
by Roy F. Steward
his attorney

Patented Mar. 23, 1937

2,074,641

UNITED STATES PATENT OFFICE 2,074,641

MEASUREMENT OF HIGH TEMPERATURES

William Jasper Clark, Norton-on-Tees, England, assignor to Imperial Chemical Industries Limited, a corporation of Great Britain Application September 30, 1936, Serial No. 103,469
In Great Britain May 23, 1934

7 Claims. (Cl. 73—32)

This invention relates to the measurement of high temperatures, i. e. temperatures at which visible radiation is emitted by solid bodies.

For the measurement of high temperatures two types of pyrometer have been used, known as optical pyrometers and total radiation pyrometers. In the former the intensity of visible radiation of the object whose temperature is to be measured is matched against an auxiliary adjustable light source by means of the eye. They are expensive and require constant attendance of an operator to take readings. In addition their accuracy is dependent on the observer's skill in matching light intensities.

In total radiation pyrometers the total radiation from the body whose temperature is to be measured is focused on a small thermo-couple, the E. M. F. of which is measured by a suitable instrument, automatic records being obtained therefrom if desired. Such pyrometers are expensive and are also greatly affected by non-black body conditions, which conditions obtain in many industrial furnaces. In addition, the thermo-couple and the focusing means, usually a concave mirror, are of necessity directly exposed to any fumes or dust in the surrounding atmosphere, since transparent screens of glass or the like material would absorb a substantial proportion of the heat radiation utilized by a full radiation pyrometer in temperature registration. Since for many industrial purposes a pyrometer has to be used in a dusty atmosphere, the total radiation type is unsatisfactory.

One object of the present invention is to provide an improved apparatus for the measurement of high temperature, which is highly sensitive and which is especially suitable for use in dusty atmospheres such as exist in many industrial plants.

A further object is to provide a pyrometer having a negligible temperature coefficient, i. e. a pyrometer the readings of which are substantially independent of the temperature of the surroundings. Still further objects are to provide a pyrometer which will give consistent readings and which will rapidly respond to changes of temperature in the hot zone under measurement without exhibiting hysteresis or fatigue effects.

These objects are attained by concentrating radiation from a hot surface, or a portion of a hot surface, the temperature of which is to be measured, on a photo-electric cell of the type which transforms radiant energy (preferably in and in the neighborhood of the visible spectrum) into electrical energy without the use of any auxiliary power source (such photo-electric cell being hereinafter referred to as a photo-voltaic cell), the electrical energy thereby generated being measured by a suitable measuring instrument, e. g. a moving coil micro-ammeter, from which, if desired, continuous records may be obtained. The amount of radiant energy incident upon the photo-voltaic cell must be chosen so that only a very small current is taken from the cell, generally not exceeding 30 microamps, and the total resistance external to the cell must be below a certain value which is dependent on the maximum current output from the cell as hereinafter will be described.

The apparatus or pyrometer set-up for carrying out the invention comprises, in its simplest form, a photo-voltaic cell and a convex lens or concave mirror adapted to concentrate radiation on the sensitive surface of the cell, together with a micro-ammeter for measuring the current output of the cell when exposed to radiation. Care must be taken that the total resistance, external to the cell, of the cell circuit is below a certain value, which, as hereinbefore mentioned, is dependent upon the maximum current output of the cell. If the total external resistance exceeds this value the cell acquires an appreciable temperature coefficient.

A suitable photo-voltaic cell for use according to the invention is the Weston "photronic" cell. The photo-electric cell consists essentially of a thin metal disc on which there is a film of light-sensitive material, e. g. copper oxide, silver or iron selenide. The metal disc forms a positive terminal and a metal collector ring in contact with the light-sensitive surface forms the negative terminal. The cell is contained in a case having a window of glass or quartz depending upon whether the cell is to be used only in the visible or in the visible and ultra-violet regions of the spectrum. There are no separate anode and collector plates or evacuated space as in the usual form of photo-electric cell, and no liquid is used. The action of the light impinging upon the sensitive surface is entirely electronic.

Photo-voltaic cells of the kind described above are usually employed in conjunction with a comparatively strong beam of light, as from an incandescent lamp, in order to operate relays for various purposes. For this purpose the cells have been required to give relatively high currents, of the order of 100 microamps or more. Hence the characteristics of these cells at low current outputs have been little investigated or understood.

I have found that below a certain value of current output which varies from one make to another of the type of cell described but in general does not exceed 30 microamps, these cells have a negligible temperature coefficient, i. e. for a given intensity of illumination the current output is independent of the temperature of the surroundings, provided that the external resistance in the cell circuit does not exceed a certain value, which is dependent upon the current output. The higher the current output the lower must be the external resistance to give a negligible temperature coefficient, i. e. not more than 0.25 per cent. per degree centigrade. I have further found that at low current outputs these cells are quickly and consistently responsive to changes of radiation intensity, there being for all practical purposes no hysteresis, lag or fatigue effects. If the current output from a photo-voltaic cell is greater than a certain limiting value, however, or if the external resistance is too high, an appreciable temperature coefficient is created, while non-consistent current outputs and hysteresis effects become apparent.

I have found that for a Weston photronic cell the maximum permissible current output is about $30\mu. a.$ if the advantages of negligible temperature coefficient, constant readings and lack of hysteresis are to be obtained. The maximum external resistance allowable in the cell circuit when the maximum current output is $30\mu. a.$ is about 500 ohms, but if the cell is arranged to work with a lower maximum current output the external resistance may be higher, e. g. with $6\mu. a.$ maximum output the external resistance may be up to $650\omega$; with $0.5\mu. a.$ maximum output the external resistance may be up to $1000\omega$.

A suitable condensing lens or mirror and a suitable size of diaphragm are chosen, so that for the given range of temperatures to be measured and the given distance from the hot body at which the instrument is to operate, the current generated will not be above about 30 micro-amps. Having fixed the maximum current, the maximum external resistance is automatically fixed and a micro-ammeter must be chosen which gives a full-scale reading with the maximum designed current and which also has a resistance below the maximum figure allowable for the designed current output. The external resistance of the circuit is not altered in any way during operation.

The instrument may be provided with a series of diaphragms so as to adapt it for use under varying conditions of illumination, but they must be designed so that under no circumstances does the illumination incident upon the cell exceed a value which produces a current greater than 30 micro-amps.

The apparatus may be used at a constant distance from a hot object of constant size, and the scale of readings of the pyrometer for the particular conditions may be calibrated by means of an optical pyrometer.

However, for many industrial purposes it is desirable that the readings of the pyrometer should be substantially independent of its distance from the hot object. For this condition to be obtained, the sensitive surface of the photo-voltaic cell must be of such dimensions that every point within it receives, from every point of the lens or mirror, radiation which comes from, and only from, the hot surface whose temperature is to be measured, it being understood that the lens or mirror is fully illuminated by the said radiation. If the sensitive surface of the cell is so large that this condition is impracticable, there may be interposed between the lens or mirror and the cell, a screen which is provided with an aperture of such dimensions that every point within it receives, from every point of the lens, radiation which has come from the hot surface. Where maximum sensitivity is required, however, it is necessary to arrange for the conjugate focus of the lens with respect to the hot object to be in the plane of the said screen. This can be achieved for a pyrometer intended for general use by the provision of means for varying the distance between the screen and the lens or mirror.

The photo-voltaic cell may be protected from dust and fumes by means of a transparent screen of suitable material, e. g. heat-resisting glass, which affects the readings of the instrument to a negligible extent, since the cell is very insensitive to radiations which are absorbed by the glass. When a convex lens is used to form the desired image, a screen for dust is not essential, since the lens itself can be used to prevent dust and fumes reaching the cell.

Figure 2:
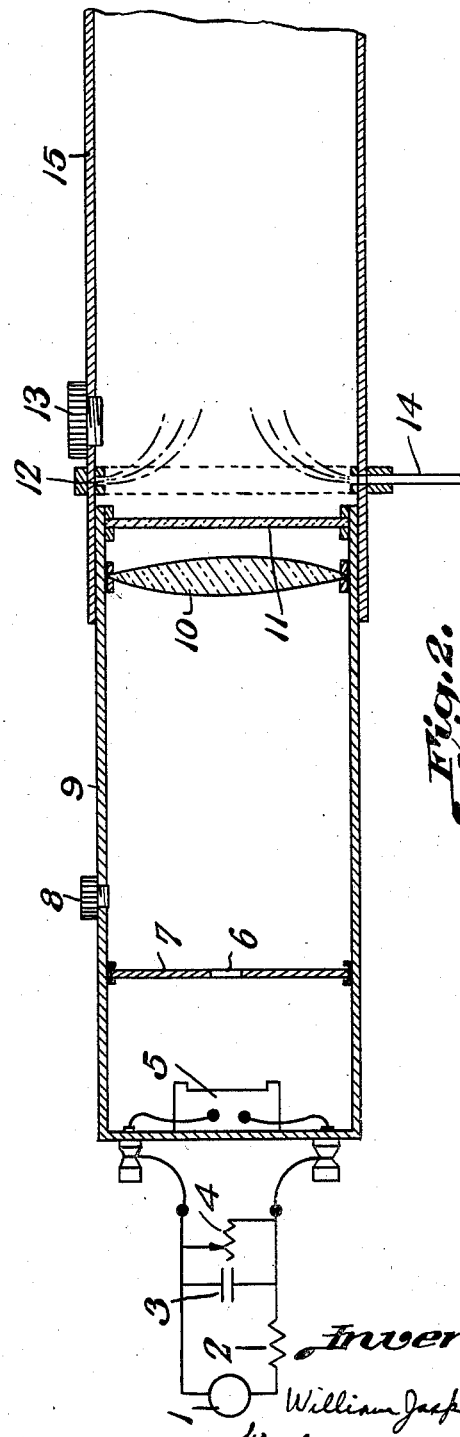

One form of the present invention will now be described with reference to the accompanying drawing, in which Figure 1 illustrates the path of radiations from the high temperature source to the photo-voltaic cell, and Figure 2 shows a section through the actual instrument, with a diagrammatic representation of the cell circuit.

A photo-voltaic cell 5, a screen 7 containing an aperture 6, and a convex lens 10 of heat-resisting glass, are mounted within a casing 9, which is open at one end so as to allow radiation from the high temperature source to fall upon the lens 10. A heat-resisting glass screen 11 is also mounted at the open end of the casing 9 to prevent dust settling on the surface of the convex lens. The case is also provided with a hood 15, so as to minimize the amount of dust and fumes approaching the screen 11 and to minimize the amount of extraneous light falling upon the lens. The hood is provided with an annular channel 12 to which is fed compressed air by pipe 14 which serves to blow away any dust entering the hood 15 and prevent its accumulation on the screen 11.

The instrument is independent of the distance of the object from the lens, the essential feature for this purpose being that the aperture in the screen 7, or if this is replaced by the photo-electric cell, the sensitive surface of the cell, is of such dimensions that every point within it receives, from every point of the lens, radiation which has come from the hot surface.

Referring to Figure 1, if the hot patch is moved from AB, which is conjugate to the screen 7, to the position $A_1B_1$ or to $A_2B_2$, there will be no change in the calibration of the instrument so long as the temperature distribution over these areas is approximately uniform, since the direction from which the radiation passing through the diaphragm is received, is unaltered. The temperatures indicated by the cell in these cases, will, of course, be those of $A_1B_1$ or $A_2B_2$ respectively. The electric current generated in the photo-voltaic cell is led directly to a micro-ammeter 1, although if desired it may be amplified before measurement. If the lens possesses aberration the diameter AB of the hot body required will vary according to the aperture of the lens and wave length of the radiation. The actual diameter required is the maximum to cover all cases.

The instrument responds instantaneously to changes in radiation received by it, and it is therefore desirable in cases where this radiation is affected by drifts of dust or flames passing between the hot patch and the sighting tube, to damp down the resulting fluctuations in readings by providing a resistance 2 in series with the micro-ammeter 1 and shunting both by a large capacity condenser 3. A variable shunt 4 enables the calibration of the instrument to be altered as desired. Plugs 8 and 13 are provided for inspection sighting and routine cleaning purposes.

The instrument is relatively inexpensive, combines the advantages of the optical pyrometer in being least affected by non-black body conditions with that of the radiation pyrometer in giving a continuous record automatically. It is also affected to a negligible extent by the temperature of its surroundings up to approximately 55° C. and keeps its calibration well in constant use.

It is rugged in construction, which makes it admirably suitable for use under severe working conditions. It is also, for all practical purposes, free from lag and is extremely sensitive at high temperatures e. g. at 1500° C. a temperature change of 1° C. is at once discernible.

Various modifications of the apparatus and procedure hereinbefore described may be made in carrying out my invention, and all said modifications are intended to come within the scope of the appended claims insofar as they achieve to a useful degree the new results, improvements and advantages hereinbefore disclosed.

The present application is a continuation in part of my earlier application, Serial No. 23,758, filed May 27, 1935, for "Pyrometers".

I claim:—

1. A pyrometer set-up comprising a photo-electric cell of the type which transforms radiant energy into electrical energy without the use of any auxiliary power source, means for concentrating radiant energy on the photo-electric cell, said cell being in circuit with means for measuring a very small maximum current output of the cell when exposed to radiation, the total resistance of the said circuit external to the said cell being chosen in relation to the maximum current output so that the latter is substantially independent of the temperature of the surroundings.

2. A pyrometer set-up comprising a photo-electric cell of the type which transforms radiant energy into electrical energy without the use of any auxiliary power source, means for concentrating radiant energy on the photo-electric cell, said cell being in circuit with means for measuring a maximum current output of the cell of between 0.5 and 30 microamps when exposed to radiation, the total resistance of the said circuit external to the said cell not exceeding a value lying between 1000 and 500 ohms respectively.

3. A pyrometer set-up comprising a photo-electric cell of the type which transforms radiant energy into electrical energy without the use of any auxiliary power source, means for concentrating radiant energy on the photo-electric cell, said cell being in circuit with means for measuring a maximum current output of the cell of $6\mu. a.$ when exposed to radiation, the total resistance of said circuit external to said cell not exceeding 650 ohms.

4. A pyrometer set-up as claimed in claim 3, in which the cell and means for concentrating radiant energy in the form of a lens or mirror are so placed relative to each other that any point on the sensitive surface of the cell receives from every point of the lens or mirror, radiation which comes from the hot surface whose temperature is to be measured.

5. A pyrometer set-up comprising a photo-voltaic cell, a condensing lens or mirror, an apertured screen intermediate between said cell and said lens or mirror and so placed that every point in the aperture receives, from every point of the lens or mirror, radiation which comes from the hot surface whose temperature is to be measured, said cell being placed so that the radiation passing through the aperture of said screen is incident upon the sensitive surface of said cell and being in circuit with a micro-ammeter, the total resistance of said circuit external to said cell not exceeding 1000—500 ohms according as the maximum current output of the cell is not above 0.5 to $30\mu. a.$ respectively.

6. A pyrometer set-up comprising a photo-voltaic cell, a condensing lens or mirror, an apertured screen, the aperture of which is adapted to be varied according to the minimum size of hot surface, the temperature of which is to be measured, placed between said cell and said lens or mirror, so that every point in the aperture receives from every point of the lens or mirror, radiation which comes from the hot surface, means for adjusting the distance between the screen and the lens or mirror, so that the screen is at the conjugate focus of the lens with respect to the hot object for the purpose of obtaining maximum sensitivity, said cell being placed so that the radiation passing through the aperture of said screen is incident upon the sensitive surface of the cell and being in circuit with a micro-ammeter the total resistance of the circuit external to the cell not exceeding 1000 to 500 ohms according as the maximum current output of the cell is not above 0.5 to 30 microamps respectively.

7. A pyrometer comprising a tubular casing open at one end, a convex lens mounted in said casing towards its open end, a photo-electric cell of the type herein set forth mounted at the other end of the casing, said cell being in circuit with a micro-ammeter for measuring the current output of the cell when exposed to radiation, the total resistance of said circuit external to said cell not exceeding 1000 to 500 ohms according as the maximum current output of the cell is not above 0.5 to $30\mu. a.$ respectively.

WILLIAM JASPER CLARK.